United States Patent
Silva et al.

(10) Patent No.: US 10,693,824 B2
(45) Date of Patent: Jun. 23, 2020

(54) ELECTRONIC MEETING MANAGEMENT

(71) Applicant: International Business Machines Corporation, Armonk, NY (US)

(72) Inventors: Asima Silva, Holden, MA (US); Darian C. S. Springer, Somerville, MA (US)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 15/265,831

(22) Filed: Sep. 14, 2016

(65) Prior Publication Data

US 2018/0077099 A1    Mar. 15, 2018

(51) Int. Cl.
*H04L 12/58* (2006.01)
*H04L 29/06* (2006.01)
*H04L 29/08* (2006.01)
*H04L 12/18* (2006.01)

(52) U.S. Cl.
CPC .......... *H04L 51/16* (2013.01); *H04L 12/1831* (2013.01); *H04L 51/04* (2013.01); *H04L 65/1083* (2013.01); *H04L 65/403* (2013.01); *H04L 65/4015* (2013.01); *H04L 67/306* (2013.01)

(58) Field of Classification Search
CPC . H04L 51/16; H04L 65/4015; H04L 65/1083; H04L 65/403; H04L 67/306; H04L 51/04; H04L 12/1831
See application file for complete search history.

(56) References Cited

U.S. PATENT DOCUMENTS

| | | | |
|---|---|---|---|
| 8,904,296 B2 | 12/2014 | Sahai et al. | |
| 2002/0049738 A1* | 4/2002 | Epstein | G06F 16/951 |
| 2002/0104088 A1* | 8/2002 | McGee, III | H04N 5/782 |
| | | | 725/51 |
| 2005/0091203 A1* | 4/2005 | Liu | G06F 16/345 |
| 2005/0234851 A1* | 10/2005 | King | H04N 1/00244 |
| 2006/0184566 A1* | 8/2006 | Lo | G06F 17/30038 |
| 2006/0247983 A1* | 11/2006 | Dalli | G06F 17/27 |
| | | | 705/26.1 |

(Continued)

OTHER PUBLICATIONS

Stiefelhagen et al.; "Modeling Focus of Attention for Meeting Indexing Based on Multiple Cues"; IEEE Transactions on Neural Networks, vol. 13, No. 4, Jul. 2002.

*Primary Examiner* — Dustin Nguyen
*Assistant Examiner* — Javier O Guzman
(74) *Attorney, Agent, or Firm* — L. Jeffrey Kelly

(57) ABSTRACT

Disclosed aspects relate to electronic meeting management. A first attentiveness factor may be detected for a first user at a first time by a meeting management engine with respect to an electronic meeting. A second attentiveness factor may be detected for the first user at a second time by the meeting management engine with respect to the electronic meeting. The second time may be subsequent to the first time, and the second attentiveness factor may differ from the first attentiveness factor. A set of meeting data for the electronic meeting may be captured between the first time and the second time. Based on the set of meeting data, the meeting management engine may determine a set of content summary data for the electronic meeting between the first time and the second time in an automated fashion. The set of content summary data may be provided to the first user.

20 Claims, 5 Drawing Sheets

(56) References Cited

U.S. PATENT DOCUMENTS

| | | | | |
|---|---|---|---|---|
| 2008/0281927 A1* | 11/2008 | Vanderwende | G06F 17/2745 | 709/206 |
| 2009/0106059 A1* | 4/2009 | Megiddo | G06Q 10/06 | 705/7.15 |
| 2010/0245536 A1* | 9/2010 | Huitema | H04N 7/147 | 348/14.08 |
| 2012/0022950 A1* | 1/2012 | Gilbert | G06Q 30/0241 | 705/14.66 |
| 2012/0144320 A1* | 6/2012 | Mishra | H04N 7/155 | 715/753 |
| 2012/0162349 A1* | 6/2012 | Alexandrov | H04L 12/1831 | 348/14.03 |
| 2012/0166921 A1* | 6/2012 | Alexandrov | H04L 65/4015 | 715/202 |
| 2012/0218373 A1* | 8/2012 | N'Guessan | H04N 7/15 | 348/14.08 |
| 2012/0284640 A1* | 11/2012 | Sloyer | G06Q 10/10 | 715/753 |
| 2013/0290434 A1* | 10/2013 | Bank | G06Q 10/10 | 709/206 |
| 2013/0325972 A1* | 12/2013 | Boston | G06K 9/00751 | 709/206 |
| 2014/0012619 A1* | 1/2014 | Natarajan | H04L 51/32 | 705/7.19 |
| 2014/0049695 A1* | 2/2014 | Papish | H04N 21/44204 | 348/731 |
| 2014/0172579 A1 | 6/2014 | Peterson et al. | | |
| 2015/0154291 A1* | 6/2015 | Shepherd | G06F 17/30861 | 707/748 |
| 2015/0358586 A1 | 12/2015 | Chaudhry et al. | | |
| 2016/0019665 A1* | 1/2016 | Collier | G06F 16/93 | 705/40 |
| 2016/0234268 A1* | 8/2016 | Ouyang | H04L 65/403 | |
| 2017/0063760 A1* | 3/2017 | Duze | H04L 51/16 | |

* cited by examiner

ELECTRONIC MEETING MANAGEMENT

BACKGROUND

This disclosure relates generally to computer systems and, more particularly, relates to electronic meeting management. Telephones, the Internet, and other communication networks may facilitate meetings between physically separated individuals and organizations. The number of electronically conducted meetings is increasing. As the number of electronic meetings increases, the need for electronic meeting management may also increase.

SUMMARY

Aspects of the disclosure relate to electronic meeting management. Data regarding user behavior and attentiveness may be used to target portions of meeting content for summary or recapping. Portions of a meeting associated with lapsed user attention may be dynamically identified and recorded. When a user's attention returns to the meeting, a summary of the meeting content relating to the missed portion of the meeting may be presented to the user. Meeting summaries may make use of data pertaining to user behavior, preferences, and profile information to generate summaries that are individually tailored to a particular user. Leveraging user behavior and attentiveness for targeted meeting summary generation may facilitate user comprehension, timeliness, low-intrusion, and meeting efficiency.

Disclosed aspects relate to electronic meeting management. A first attentiveness factor may be detected for a first user at a first time by a meeting management engine with respect to an electronic meeting. A second attentiveness factor may be detected for the first user at a second time by the meeting management engine with respect to the electronic meeting. The second time may be subsequent to the first time, and the second attentiveness factor may differ from the first attentiveness factor. A set of meeting data for the electronic meeting may be captured between the first time and the second time. Based on the set of meeting data, the meeting management engine may determine a set of content summary data for the electronic meeting between the first time and the second time in an automated fashion. The set of content summary data may be provided to the first user.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
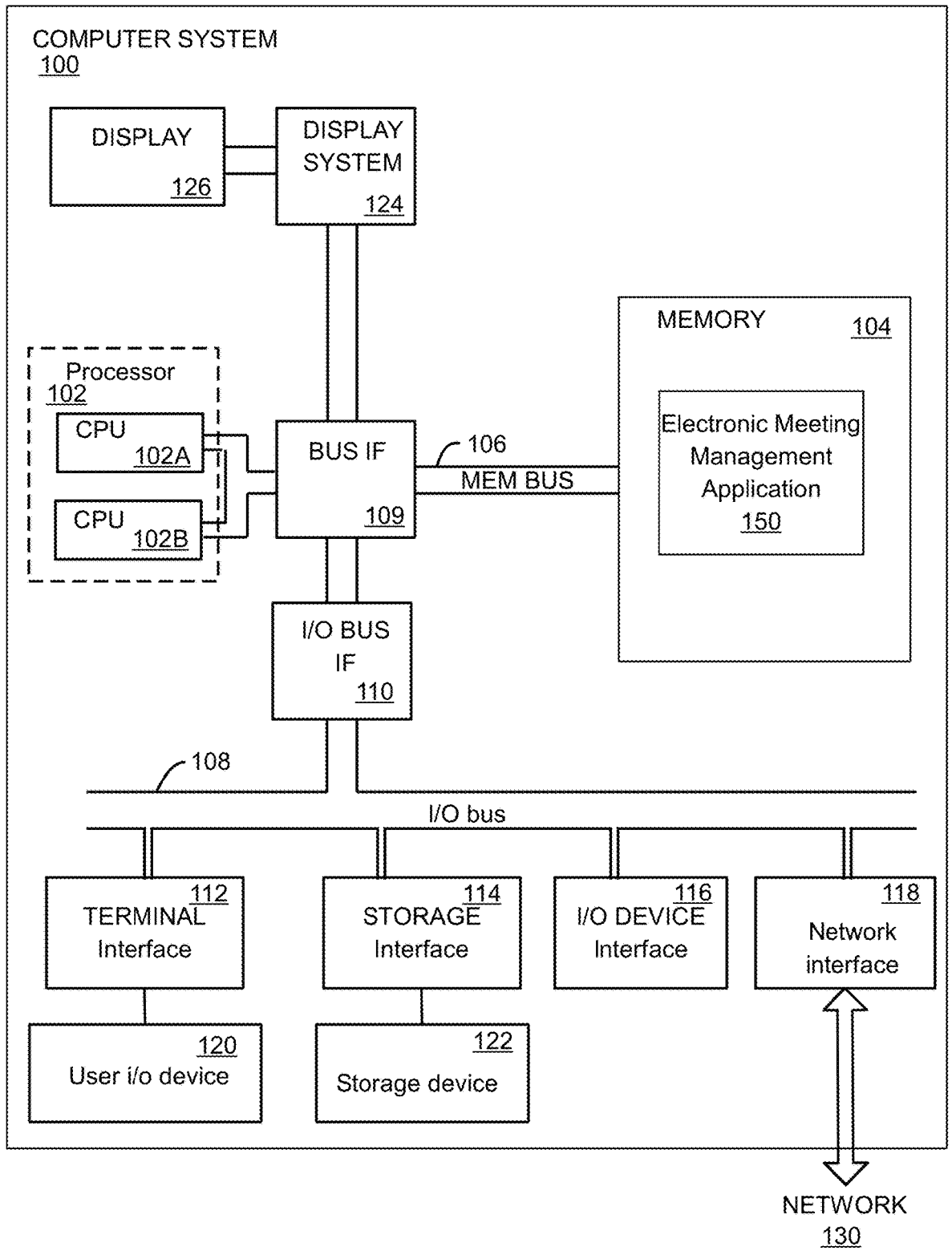
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to electronic meeting management. Data regarding user behavior and attentiveness may be used to target portions of meeting content for summary or recapping. Portions of a meeting associated with lapsed user attention may be dynamically identified and recorded. When a user's attention returns to the meeting, a summary of the meeting content relating to the missed portion of the meeting may be presented to the user. Meeting summaries may make use of data pertaining to user behavior, preferences, and profile information to generate summaries that are individually tailored to a particular user. Leveraging user behavior and attentiveness for targeted meeting summary generation may facilitate user comprehension, timeliness, low-intrusion, and meeting efficiency.

Meetings are one method of facilitating information sharing, planning, and other types of communication between individuals or organizations. With the advance of technology, electronic meetings (e.g., conference calls, video conferences) held between parties in physically separate locations have become increasingly common. Aspects of the disclosure relate to the recognition that, in some situations, users may lose attention to an electronic meeting as the result of distractions, multitasking, or loss of interest in the topic being discussed. When a user returns attention to the meeting, he or she may have missed information that was discussed while the user was inattentive. Accordingly, aspects of the disclosure relate to monitoring user attentiveness with respect to an electronic meeting, and dynamically initiating data capture of the electronic meeting until the user regains attention. Upon a user's attention returning to the meeting, a summary of the electronic meeting may be provided to the user for the portion of the meeting to which he or she was not attentive. Aspects of the disclosure may be associated with benefits including meeting efficiency, user comprehension, and communication.

Aspects of the disclosure relate to making use of user attention and behavior information to make decisions about when a user needs a summary of what took place in a meeting while the user's attention was elsewhere. The summary may be dynamically generated based on when the user's attention was lost and the point in time when the user's attention is regained. The summary may be automatically presented to the user at the time when their attention returns to the meeting. In this way, all participants in the meeting may be kept up to date, and the need for individuals to be caught up on meeting developments may be avoided. Additionally, summary content may be individually personalized based on the portion of the meeting missed by a particular user, topics of interest to the user, or other user preferences.

Disclosed aspects relate to using cognitive measures and metrics to define when a user has moved their attention away from a meeting. Recording of the meeting may begin based on metrics such as browser window focus, retina loss, applications opening, and the like. Summary information for the meeting may be delivered unobtrusively to a user so as not to distract the user's attention from the meeting in progress. The summary information may be delivered at a pace that is faster than the meeting pace while remaining comprehensible and understandable, such that the user may be caught up to the current meeting developments. The summary information may be presented as an audio file, text transcript, video file, or other forms of media.

Aspects of the disclosure relate to a system, method, and computer program product for electronic meeting management. The electronic meeting may include a first and second user, where the first user is in a first physical location, the second user is in a second physical location, and the second physical location differs from the first physical location. Aspects of the disclosure relate to detecting a first attentiveness factor for a first user at a first time. The first attentiveness factor may be detected by a meeting management engine with respect to an electronic meeting. A second attentiveness factor may be detected by the meeting management engine for the first user at a second time. The second time may be subsequent to the first time and the second attentiveness factor may differ from the first attentiveness factor. A set of meeting data for the electronic meeting may be captured by the meeting management engine between the first time and the second time. Capturing the set of meeting data may include ingesting a segment of the electronic meeting in a dynamic fashion. The segment of the electronic meeting may include a germane portion of the electronic meeting. A set of content summary data for the electronic meeting between the first time and the second time may be determined by the meeting management engine in an automated fashion. The set of content summary data may include a text transcript, an outline, a set of keywords, a set of topics discussed, an audio message, a video message, or a still image. The set of content summary data may be provided to the first user by the meeting management engine.

In embodiments, it may be computed that a threshold attentiveness factor exceeds the first attentiveness factor for the first user. Based on and in response to computing that the threshold attentiveness factor exceeds the first attentiveness factor for the first user, capture of the set of meeting data for the electronic meeting may be initiated. In embodiments, it may be computed that the second attentiveness factor for the first user exceeds the threshold attentiveness factor. Based on and in response to computing that the second attentiveness factor for the first user exceeds the threshold attentiveness factor, determination of the set of content summary data for the electronic meeting between the first time and the second time may be initiated.

In embodiments, the first user of the electronic meeting may be monitored using a set of computer based sensors. Based on the monitoring, a set of first user sensor data may be collected. Based on the set of first user sensor data, the first and second attentiveness factors for the first user may be calculated. In embodiments, the set of first user sensor data may include a meeting entrance, a typing speed, a browser window focus, an eye gaze, a retina loss, an application opening, a number of opening applications, and a set of social media activity by the first user. In embodiments, the first attentiveness factor may indicate an apparent absence of the first user with respect to the electronic meeting, and the second attentiveness factor may indicate an apparent presence of the first user with respect to the electronic meeting. In embodiments, the set of content summary data may be personalized for the first user.

In embodiments, determining the set of content summary data for the electronic meeting may include ingesting a first subset of the set of meeting data that pertains to a first topic of the electronic meeting, and disregarding a second subset of the set of meeting data that pertains to a second topic of the electronic meeting. In embodiments, a first relevancy factor for the first topic may exceed a benchmark relevancy factor for the first user, and the benchmark relevancy factor for the first user may exceed a second relevancy factor for the second topic. In embodiments, providing the set of content summary data may include delivering the set of content summary data at a delivery pace faster than a meeting pace. In embodiments, detecting the first attentiveness factor for the first user at the first time may include selecting the first attentiveness factor for the first user at the first time by the meeting management engine based on a set of first user profile data. In embodiments, the set of content summary data may be organized in a reverse chronological order by topic including providing a most recent topic before a least recent topic. In embodiments, the set of content summary data may be organized in a topical time-spent order by time spent, including providing a most time-spent topic before a least time-spent topic. Altogether, aspects of the disclosure can have performance or efficiency benefits (e.g., data communication reliability, speed, flexibility, responsiveness, productivity). Aspects may save resources such as network bandwidth, time, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store an electronic meeting management application 150. In embodiments, the electronic meeting management application 150 may include instructions or statements that execute on the processor 102 or instructions or statements that are interpreted by instructions or statements that execute on the processor 102 to carry out the functions as further described below. In certain embodiments, the electronic meeting management application 150 is implemented in hardware via semiconductor devices, chips, logical gates, circuits, circuit cards, and/or other physical hardware devices in lieu of, or in addition to, a processor-based system. In embodiments, the electronic meeting management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1B illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
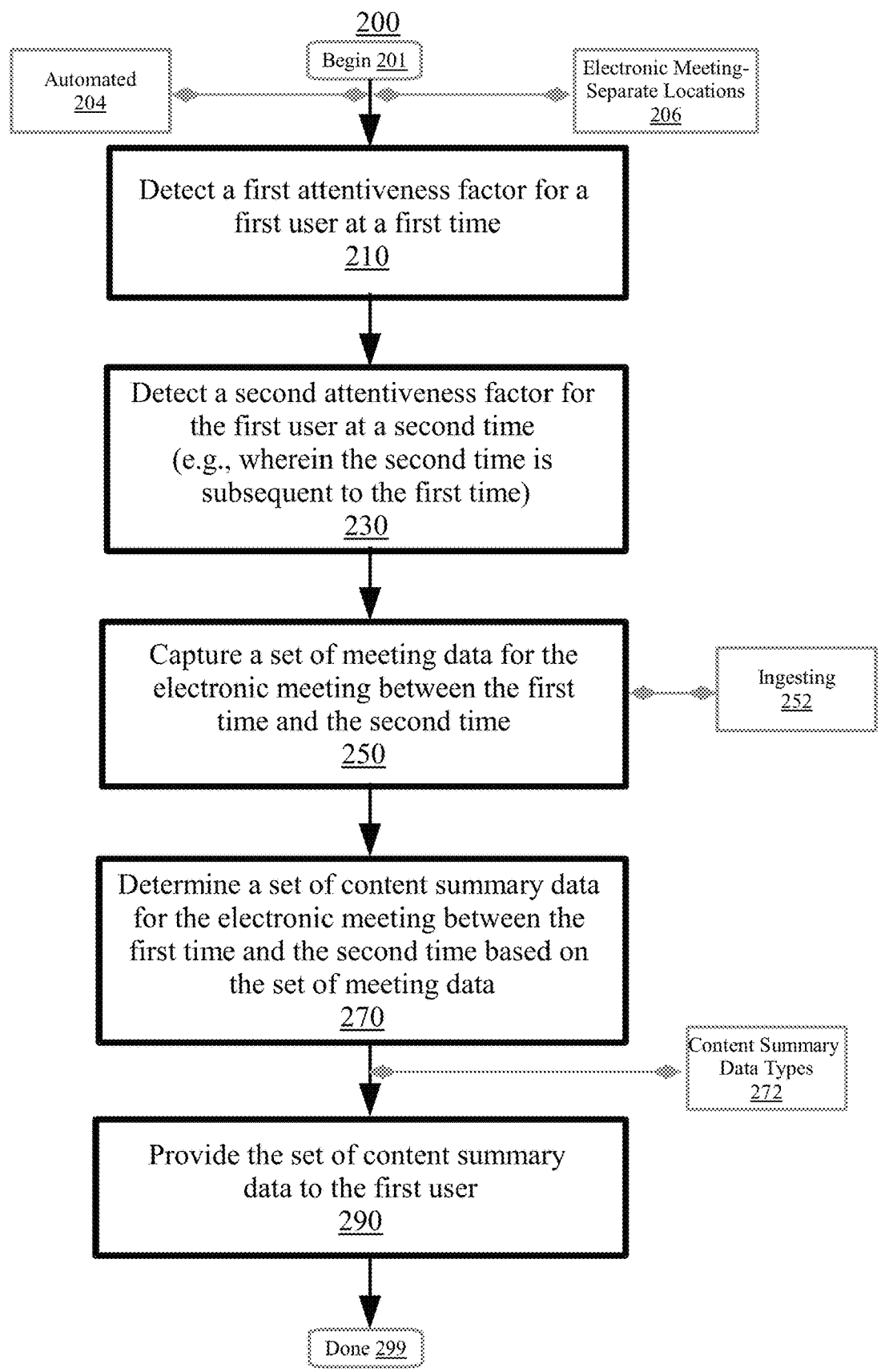
FIG. 2 is a flowchart illustrating a method for electronic meeting management, according to embodiments.

FIG. 2 is a flowchart illustrating a method 200 for electronic meeting management, according to embodiments. Aspects of FIG. 2 relate to using attentiveness factors for a user to identify a portion of an electronic meeting associated with low user attentiveness, and generating a set of content summary data to recap the content of the meeting for a user. One or more portions of the meeting associated with low user attentiveness may be automatically recorded, and the set of content summary data may be presented when the user's attention returns to the meeting. The set of content summary data may be customized based on user behavior, user preferences, and profile data for a user. The method 200 may include a first detecting block 210, a second detecting block 230, a capturing block 250, a determining block 270, a providing block 290, and a number of other blocks for implementing aspects of electronic meeting management. The method 200 may begin at block 201. Leveraging attentiveness factors for a user with respect to an electronic meeting may facilitate user comprehension, timeliness, low-intrusion, and meeting efficiency.

In embodiments, the detecting, the detecting, the capturing, the determining, the providing, and other steps described herein may each occur in an automated fashion without user intervention at block 204. In embodiments, the detecting, the detecting, the capturing, the determining, the providing, and other steps described herein may be carried out by an internal electronic meeting management module maintained in a persistent storage device of a computing device (e.g., computing device connected to an electronic meeting). In certain embodiments, the detecting, the detecting, the capturing, the determining, the providing, and other steps described herein may be carried out by an external electronic meeting management module hosted by a remote computing device (e.g., electronic meeting host) or server (e.g., accessible via a subscription, usage-based, or other service model). In this way, aspects of electronic meeting management may be performed using automated computing machinery without manual action. Other methods of performing the steps described herein are also possible.

In embodiments, the electronic meeting may include a first and a second user located in separate physical locations at block 206. The electronic meeting may include a first user in a first physical location and a second user in a second physical location, where the first physical location differs from the second physical location. Generally, the electronic meeting may include a gathering, conference, discussion, collaboration, or other communication session between individuals over an electronic medium. In embodiments, the electronic meeting may be performed using Internet-based software which allows individuals and groups stationed in separate geographical locations to facilitate discussion and collaboration without travel. In certain embodiments, the electronic meeting may include conference calls, web conferences, Voice Over Internet Protocol (VOIP) based group interactions, or the like. In certain embodiments, the electronic meeting may include one or more co-located users. As an example, consider a situation in which three individuals from a first company engage in a web conference with individuals from a second company and four individuals from a third company. In embodiments, the electronic meeting may be maintained by a meeting management engine. The meeting management engine may include a system of hardware and software components configured to conduct, operate, regulate, monitor, or otherwise facilitate execution of the electronic meeting. Other types of electronic meetings are also possible.

At block 210, a first attentiveness factor may be detected for a first user at a first time. The first attentiveness factor may be detected by a meeting management engine with respect to an electronic meeting. Generally, detecting can include sensing, discovering, distinguishing, recognizing, or otherwise identifying the first attentiveness factor. The first attentiveness factor may include an indication of the degree or extent to which a user is cognitively engaged in a particular activity (e.g., an electronic meeting). The first attentiveness factor may include a quantitative representation of a user's attention in the form of an integer, percentage, decimal, or other value (e.g., attentiveness score of 60 out of a maximum of 100, where higher values indicate greater attentiveness). In embodiments, the first attentiveness factor may include a qualitative expression of a user's attention in the form of a relative, subjective assessment (e.g., "poor" attentiveness, "partial" attentiveness). In embodiments, the attentiveness factor may be expressed in a binary format where a first value (e.g., 1) indicates that the user is substantially attentive (e.g., directing attention to a given activity) and a second value (e.g., 0) indicates that a user is substantially inattentive (e.g., distracted, focused elsewhere). As described herein, aspects of the disclosure relate to detecting a first attentiveness factor for a first user with respect to an electronic meeting at a first time (e.g., moment, instant, temporal point). For instance, in embodiments, detecting the first attentiveness factor for the user may include assessing the behavior and attention direction of the user, and ascertaining that the user is not attentive to the electronic meeting at a particular point in time. Non-attentiveness may include focusing on a task or activity other than the electronic meeting, absence from the meeting, or other cognitive diversion (e.g., sleeping). Other methods of detecting the first attentiveness factor are also possible.

Consider the following example. During a web conference, a first participant may receive a message (e.g., email, instant message) from a manager that requires a prompt reply. As described herein, a meeting management engine may assess the attentiveness of the first participant and detect a first attentiveness factor for the first participant at a first time (e.g., 10:37 AM). The first attentiveness factor may indicate that the first participant is non-attentive to the web conference at the first time (e.g., the first participant is directing attention toward writing a response for his or her manager). In response to ascertaining the first attentiveness factor for the first participant, the meeting management engine may record status information for the first attentiveness factor in an attentiveness management database. For instance, a data entry for the first attentiveness factor may be generated, and information indicating that the first participant was non-attentive to the electronic meeting at the first time (e.g., 10:37 AM) may be logged in the data entry. Other methods of detecting the first attentiveness factor are also possible.

At block 230, a second attentiveness factor for the first user may be detected at a second time. Generally, detecting can include sensing, discovering, distinguishing, recognizing, or otherwise identifying the second attentiveness factor. As described herein, the second attentiveness factor may include a qualitative or quantitative indication of the degree or extent to which a user is cognitively engaged in a particular activity (e.g., an electronic meeting). In embodiments, aspects of the disclosure relate to detecting a second attentiveness factor that differs from the first attentiveness factor at a second time which is subsequent to (e.g., after, later than) the first time. For instance, the second attentiveness factor may indicate a different level of attentiveness with respect to the electronic meeting than the first attentiveness factor (e.g., increased or decreased attentiveness with respect to the first attentiveness factor). As an example, in embodiments, the second attentiveness factor may indicate that a user is substantially attentive to the electronic meeting at the second time (e.g., the attention of the user has returned to the electronic meeting). In embodiments, detecting the second attentiveness factor may include monitoring the first user for an attentiveness fluctuation (e.g., change or variation in attentiveness with respect to the electronic meeting) in response to detecting the first attentiveness factor. Other methods of detecting the second attentiveness factor for the first user at the second time are also possible.

Consider the following example. With reference to the example described above, the first participant may finish writing a response to the message received from his or her manager, and send the response. Following transmission of the response, the first participant may return his or her focus to the in-progress web conference. Accordingly, as described herein, the meeting management engine may assess the attentiveness of the first participant, and detect a second attentiveness factor for the first participant at a second time subsequent to the first time (e.g., 10:49 AM). The second attentiveness factor may indicate the first participant is attentive to the web conference at the second time (e.g., as the first participant has finished the reply, he or she has refocused on the web conference). In response to ascertaining the second attentiveness factor for the first participant, the meeting management engine may record status information for the second attentiveness factor in the attentiveness management database. For instance, information indicating that the first participant was attentive to the electronic meeting at the second time (e.g., 10:49 AM) may be logged in a data entry. Other methods of detecting the second attentiveness factor are also possible.

At block 250, a set of meeting data for the electronic meeting may be captured. The set of meeting data may be captured by the meeting management engine between the first time and the second time. Generally, capturing can include collecting, gathering, recording, obtaining, or otherwise acquiring the set of meeting data. The set of meeting data may include information that represents, depicts, describes, illustrates, or reproduces the content or events of the electronic meeting. The set of meeting data may include audio files, video footage, still images, textual data, or data in other forms of media. As described herein, in embodiments, the set of meeting data may be captured for one or more segments or portions of the electronic meeting that took place between the first time and the second time (e.g., the time frame starting with detection of the first attentiveness factor and ending with detection of the second attentiveness factor). In embodiments, capturing may include initiating video recording, audio recording, or text transcription of the electronic meeting in response to detection of the first attentiveness factor (e.g., user attentiveness falls below a threshold level). The captured set of meeting data may be stored and maintained on local storage of a computing device (e.g., computing device of the first user) or in storage of a remote server (e.g., electronic meeting host). In this way, the set of meeting data may be captured to encompass the portion of the electronic meeting associated with low user cognitive engagement (e.g., non-attentiveness). Other methods of capturing the set of meeting data for the electronic meeting between the first time and the second time are also possible.

Consider the following example. A first user may be participating in a web-based video conference. The user may receive a phone call that takes his or her attention away from the video conference at 2:14 PM. Accordingly, as described herein, the meeting management engine may be configured to detect a first attentiveness factor for the user that indicates that the user is non-attentive to the video conference (e.g., the user is preoccupied with the phone call). In response to detecting the first attentiveness factor (e.g., that the attentiveness of the user is below a threshold), recording of the audio and video of the conference may be initiated (e.g., at 2:14 PM) to capture the set of meeting data. In embodiments, recording the video conference may include performing voice-to-text transcription of the dialogue of the meeting. Upon completion of the phone call, the user may return his or her attention to the video conference at 2:22 PM. In response to detecting a second attentiveness factor that indicates that the user is attentive to the video conference, recording of the video conference may cease (e.g., at 2:22 PM). Other methods of capturing the set of meeting data for the electronic meeting are also possible.

In embodiments, capturing the set of meeting data for the electronic meeting may include ingesting a segment of the electronic meeting in a dynamic fashion at block 252. The segment of the electronic meeting may include only a germane portion of the electronic meeting. Generally, ingesting can include importing, collecting, taking in, processing, or otherwise receiving the segment of the electronic meeting. As described herein, aspects of the disclosure relate to capturing a portion of the meeting associated with low user attentiveness (e.g., to summarize missed content for a user). In embodiments, aspects of the disclosure relate to dynamically (e.g., ongoing, in real-time, on-the-fly) identifying and capturing portions of the electronic meeting that pertain to a set of relevant topics (e.g., areas of interest, subjects pertinent to the job role of the user as specified in a user profile) with respect to a user. As an example, for a user associated with an organization role of "finance manager," a segment of an electronic meeting that pertains to "4th Quarter Profits" may be identified as a germane portion of the electronic meeting and captured (e.g., for summary). Other methods of ingesting the segment of the electronic meeting are also possible.

At block 270, a set of content summary data for the electronic meeting between the first time and the second time may be determined. The set of content summary data may be determined by the meeting management engine in an automated fashion based on the set of meeting data. Generally, determining can include formulating, composing, computing, resolving, or ascertaining the set of content summary data for the electronic meeting. The set of content summary data may include information that outlines, recaps, compiles, abridges, or otherwise summarizes the content (e.g., developments, discussion, substance) of the electronic meeting. In embodiments, determining may include examining the captured set of meeting data, and performing one or more of a set of content analysis techniques (e.g., optical character recognition, discourse analysis, information retrieval) to decipher the development (e.g., flow of discussion, dialogues, questions, answers, presentations) of the electronic meeting. Natural language processing techniques (e.g., part-of-speech tagging, sentiment analysis, morphological segmentation) may be used to parse syntactic and semantic content of the electronic meeting and identify contextually-relevant points or topics for summary. In embodiments, determining the set of content summary data may include using machine learning-based methods of automatic summarization to generate a representative outline or abstract of the set of meeting data. For instance, extraction techniques may be used to select a subset of words, phrases, images, video clips, or audio content from the set of meeting data for incorporation in the set of content summary data. As another example, abstraction methods may be used to construct a holistic semantic representation of the set of meeting data for inclusion in the set of content summary data. Other methods of determining the set of content summary data based on the set of meeting data are also possible.

Consider the following example. A set of meeting data may be collected for an electronic meeting between a first time (e.g., 9:54 AM) and a second time (e.g., 10:22 AM). The set of meeting data may include a video and audio recording of the meeting between the first time and the second time. In embodiments, the set of meeting data may be analyzed, and topics for different time frames of the electronic meeting between the first and second time may be ascertained. For instance, it may be determined that 9:45 AM to 10:01 is associated with a topic of new product introductions, 10:02 AM to 10:15 AM is associated with a topic of new product design specifications, and 10:16 AM to 10:22 AM is associated with a new product question and answer session. As described herein, content analysis techniques may be used to extract context-relevant points for each identified topic segment of the set of meeting data. For example, for the first segment of the meeting data, information such as the name, projected price point, release date, target demographic, and other data for the new project may be extracted. Sentences, images (e.g., presentation slides), and audio/clips may also be extracted from the set of meeting data for inclusion in the set of content summary data. Using the data extracted from the set of meeting data, a set of content summary data may be generated to provide a user with an outline of the topics, relevant points, and other important information for the electronic meeting between the first time and the second time. Other methods of determining the set of content summary data are also possible.

In embodiments, the content summary data may include one or more of a number of different types at block 272. In embodiments, the set of content summary data may include a text transcript. The text transcript may include a textual copy or reproduction of the dialogue, discussion, questions, and answers of the electronic meeting (e.g., word-for-word dialogue reproduction). In embodiments, the set of content summary data may include an outline. The outline may include a representation of the main features, relevant points, or overall flow of the electronic meeting (e.g., introduction, financial discussion, personnel changes, profit goals, wrap-up). In embodiments, the set of content summary data may include a set of keywords. The set of keywords may include words, phrases, or sentences associated with particular significance, importance or relevance with respect to the electronic meeting (e.g., "productivity", "goal-setting"). In embodiments, the set of content summary data may include a set of topics discussed. The set of topics discussed may include subjects, themes, or concepts mentioned or discussed during the electronic meeting (e.g., "thermal management," "material selection"). In embodiments, the set of content summary data may include an audio message. The audio message may include a sound recording of a quote, portion of discussion, presentation, or other element of the electronic meeting (e.g., quote from a manager or other participant). In embodiments, the set of content summary data may include a video message. The video message may include a moving visual representation of a portion of the electronic meeting (e.g., video of a presentation). In embodiments, the set of content summary data may include a still image. The still image may include a picture, photograph, or other visual reproduction of a scene of the electronic meeting (e.g., presentation slide). Other types of the set of content summary data are also possible.

At block 290, the set of content summary data may be provided. The set of content summary data may be provided by the meeting management engine to the first user. Generally, providing can include presenting, displaying, sending, conveying, exhibiting, or supplying the set of content summary data to the first user. In embodiments, providing may include displaying the set of content summary data to the user in response to detecting that the user is attentive to the electronic meeting. In embodiments, aspects of the disclosure relate to delivering the set of content summary data to the user seamlessly (e.g., unobtrusively, without interrupting the electronic meeting). For example, in certain embodiments, the set of content summary data may be provided as a text passage in an unused area of the screen used for displaying the electronic meeting. In embodiments, providing the set of content summary data may include presenting a series of consecutive video clips subtitled with accompanying text to recap the main points of a portion of the electronic meeting. Other methods of providing the set of summary content to the first user are also possible.

Consider the following example. During an electronic meeting, a first user may leave the electronic meeting to go to the restroom at a first time (e.g., 2:13 PM). A meeting management engine may assess the attentiveness of the first user and detect a first attentiveness factor that indicates that the first user is not attentive to the meeting (e.g., the first user is absent, and therefore not attentive to the meeting). In response to detecting that the first user is not attentive to the electronic meeting, the meeting management engine may initiate capturing of a set of meeting data by recording video and audio content of the electronic meeting. At a later time (e.g., 2:29 PM) the meeting management engine may detect a second attentiveness factor that indicates that the second user has returned from the restroom and refocused their attention on the meeting. As such, the meeting management engine may cease video and audio recording of the electronic meeting. As described herein, the meeting management engine may perform one or more content analysis techniques to determine a set of content summary data based on the captured set of meeting data. As an example, a set of content summary data may be determined that indicates that the time frame between 2:13 and 2:18 PM related to a second user's proposal to landscape a north lot to create a vegetable garden, the time frame between 2:19 and 2:26 PM related to the pros and cons of creating the vegetable garden (e.g., fresh organic vegetables, cost savings, garden maintenance resources), and the time frame between 2:27 and 2:29 PM was associated with a decision to implement creation of the vegetable garden. The set of content summary data may be presented to the first user in the form of a text summary with images of the second user's vegetable garden proposal, description of the pros and cons raised by different users, and the final decision and associated reason to move forward with creation of the vegetable garden. Other methods of electronic meeting management are also possible.

Method 200 concludes at block 299. Aspects of method 200 may provide performance or efficiency benefits for electronic meeting management. For example, aspects of method 200 may have positive impacts with respect to determining and providing a set of content summary data to a user based on user attentiveness to an electronic meeting. As described herein, the detecting, the detecting, the capturing, the determining, the providing, and other steps described herein may each occur in an automated fashion without user intervention. Altogether, leveraging user behavior and attentiveness for targeted meeting summary generation may facilitate user comprehension, timeliness, low-intrusion, and meeting efficiency.

Figure 3:
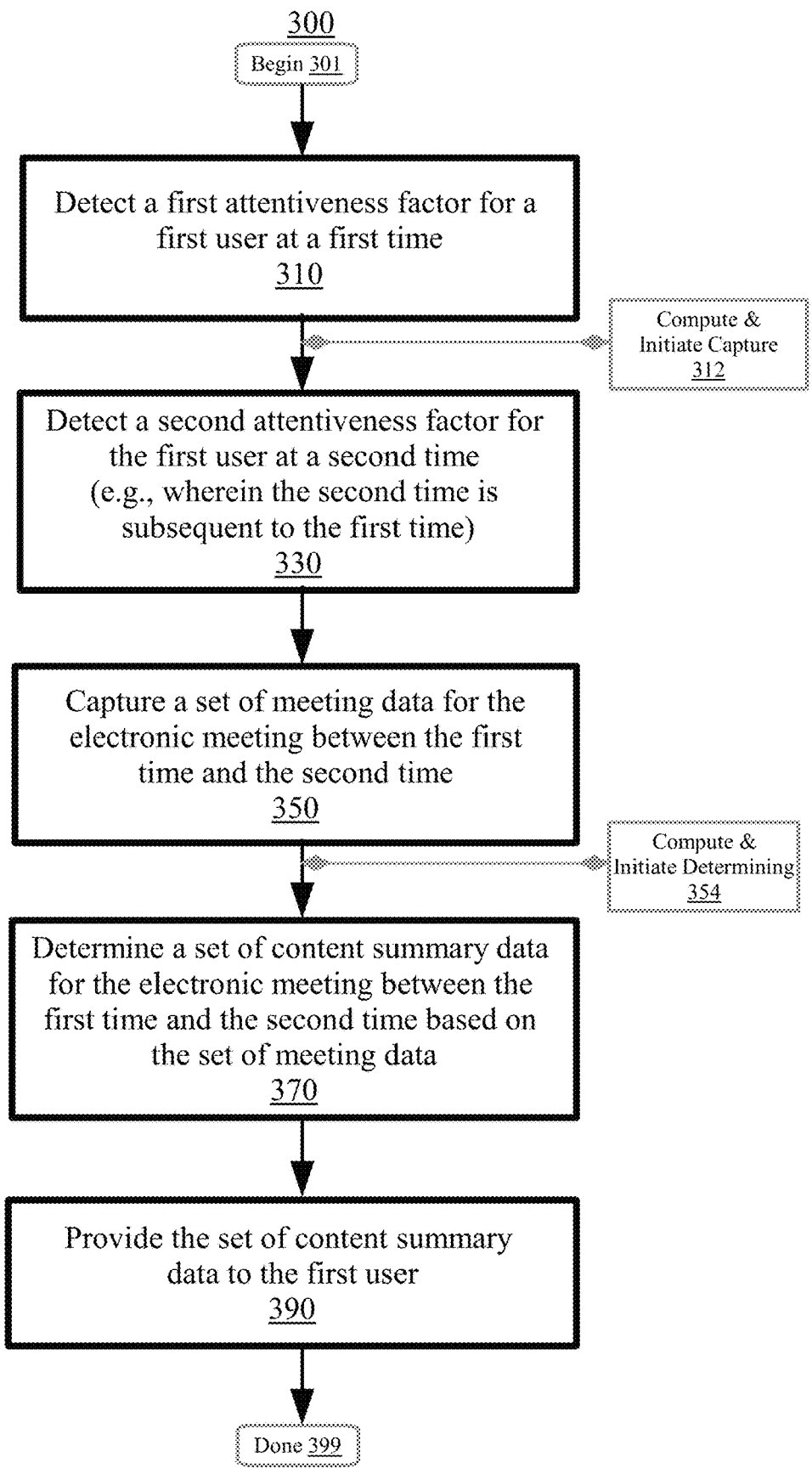
FIG. 3 is a flowchart illustrating a method for electronic meeting management, according to embodiments.

FIG. 3 is a flowchart illustrating a method 300 for electronic meeting management, according to embodiments. Aspects of FIG. 3 relate to using attentiveness factors for a user to initiate capture of a set of meeting data and determination of a set of content summary data for an electronic meeting. Aspects of FIG. 3 may substantially correspond to other embodiments described herein and shown in the FIGS. 1-5. The method 300 may include a first detecting block 310 to detect a first attentiveness factor, a second detecting block 330 to detect a second attentiveness factor, a capturing block 350 to capture a set of meeting data, a determining block 370 to determine a set of content summary data, and a providing block 390 to provide the set of content summary data to a first user. The method 300 may begin at block 301. Leveraging attentiveness factors for a user with respect to an electronic meeting may facilitate user comprehension, timeliness, low-intrusion, and meeting efficiency.

In embodiments, it may be computed that a threshold attentiveness factor exceeds the first attentiveness factor for the first user at block 312. Generally, computing can include calculating, formulating, deriving, or otherwise determining that the threshold attentiveness factor exceeds the first attentiveness factor. The threshold attentiveness factor may include a benchmark attentiveness value (e.g., integer value such as 80) that defines the boundary between user attentiveness and inattentiveness. Attentiveness factors that do not achieve the threshold attentiveness factor may be classified as inattentive (e.g., lack of cognitive engagement in a particular activity), and attentiveness factors that do achieve the threshold attentiveness factor may be classified as attentive (e.g., cognitively engaged in a particular activity). In embodiments, computing may include examining the threshold attentiveness factor with respect to the first attentiveness factor, and ascertaining that the threshold attentiveness factor exceeds the first attentiveness factor (e.g., threshold attentiveness factor of 80 exceeds a first attentiveness factor of 62). Accordingly, it may be determined that the first attentiveness factor indicates that the first user is inattentive to the electronic meeting at a first time. Based on and in response to computing that the threshold attentiveness factor exceeds the first attentiveness factor for the first user, capture of the set of meeting data for the electronic meeting may be initiated. Generally, initiating can include beginning, instantiating, commencing, or otherwise starting capture of the set of meeting data. In embodiments, initiating capture of the set of meeting data may include transmitting a program command or instruction to an application to begin capturing of the set of meeting data. Other methods of computing that the threshold attentiveness factor exceeds the first attentiveness factor and initiating capture of the set of meeting data are also possible.

In embodiments, it may be computed that a second attentiveness factor for the first user exceeds the threshold attentiveness factor at block 354. Generally, computing can include calculating, formulating, deriving, or otherwise determining that the second attentiveness factor exceeds the threshold attentiveness factor. As described herein, attentiveness factors that exceed the threshold attentiveness factor may be classified as attentive (e.g., cognitively engaged in a particular activity). In embodiments, computing may include examining the threshold attentiveness factor with respect to the second attentiveness factor, and ascertaining that the second attentiveness factor exceeds the threshold attentiveness factor (e.g., second attentiveness factor of 91 exceeds the threshold attentiveness factor of 80). In embodiments, the threshold attentiveness factor may include a predetermined, constant value (e.g., 75) used for comparison/evaluation with both the first and second attentiveness factors. In certain embodiments, the threshold attentiveness factor may include a set of staggered threshold values (e.g., the threshold value that defines "inattentiveness" and the threshold value that defines "attentiveness" may be different). Based on and in response to computing that the second attentiveness factor for the first user exceeds the threshold attentiveness factor, determination of the set of content summary data for the electronic meeting between the first time and the second time may be initiated. Generally, initiating can include beginning, instantiating, commencing, or otherwise starting determination of the set of content summary data. In embodiments, initiating determination of the set of content summary data may include activating one or more content analysis techniques to analyze the set of meeting data and determine the set of content summary data for the electronic meeting. Other methods of computing that the second attentiveness factor exceeds the threshold attentiveness factor and initiating determination of the set of content summary data are also possible. The method 300 may end at block 399.

Figure 4:
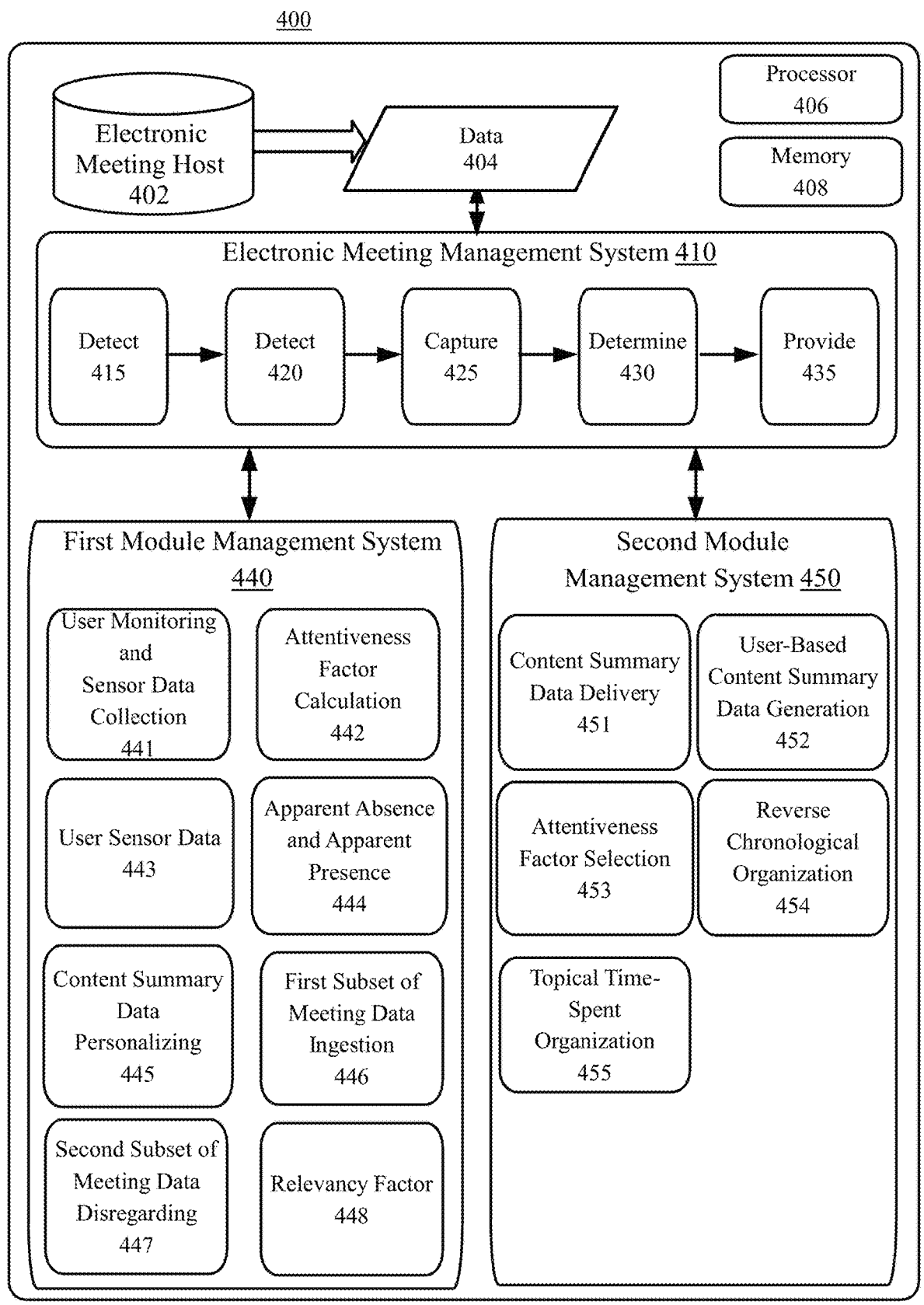
FIG. 4 shows an example system for electronic meeting management, according to embodiments.

FIG. 4 shows an example system 400 for electronic meeting management, according to embodiments. Aspects of FIG. 4 relate to using attentiveness factors for a user to identify a portion of an electronic meeting associated with low user attentiveness, and generating a set of content summary data to recap the content of the meeting for a user. The example system 400 may include a processor 406 and a memory 408 to facilitate implementation of electronic meeting management techniques. In embodiments, the example system 400 may include an electronic meeting host 402. The electronic meeting host 402 may include a server or other computing device that hosts or facilitates operation of the electronic meeting. The example system 400 may include an electronic meeting management system 410. The electronic meeting management system 410 may be communicatively connected to the electronic meeting host 402, and be configured to receive data 404 (e.g., broadcast/connection to the electronic meeting) that may be used for electronic meeting management. The electronic meeting management system 410 may include a detecting module 415 to detect a first attentiveness factor, a detecting module 420 to detect a second attentiveness factor, a capturing module 425 to capture a set of meeting data for the electronic meeting, a determining module 430 to determine a set of content summary data for the electronic meeting, and a providing module 435 to provide the set of content summary data. In embodiments, the detecting, detecting, capturing, determining, and providing may each be performed in a dynamic fashion (e.g., in real-time, on-the-fly) by the electronic meeting management system 410 to streamline electronic meeting management. The electronic management meeting system 410 may be communicatively connected with a first module management system 440 and a second module management system 450 that each include one or more modules for implementing aspects of electronic meeting management.

In embodiments, a set of computer-based sensors may be used to monitor the first user of the electronic meeting at module 441. Generally, monitoring can include scanning, observing, auditing, supervising, assessing, or surveying, the first user. Monitoring can include querying (e.g., asking a question), searching (e.g., exploring for a reason), obtaining (e.g., recording a collection), probing (e.g., checking a property), scanning (e.g., reviewing a sample), or tracking (e.g., following a characteristic). In embodiments, monitoring may include periodically assessing the first user with respect to a set of attentiveness criteria (e.g., responsiveness to particular stimuli, engagement level, primary activity) to ascertain the first user's cognitive engagement with respect to the electronic meeting. In embodiments, monitoring may be performed using a set of computer-based sensors. As examples, the set of computer-based sensors may include cameras (e.g., web cams), microphones, input devices (e.g., keyboards, mice, touchpads) and other sensory devices. In embodiments, based on the monitoring, a set of first user sensor data may be collected. Generally, collecting can include gathering, receiving, aggregating, acquiring, or obtaining the set of first user sensor data. The set of first user sensor data can include information that indicates the level of attentiveness of the first user with respect to the electronic meeting. As an example, collecting the set of first user sensor data may include using a camera to detect the direction in which the first user is looking (e.g., looking at a computer screen may indicate attentiveness to the first meeting, while looking away from the computer screen may indicate inattentiveness). Other methods of monitoring the first user and collecting the set of user sensor data are also possible.

In embodiments, the first and second attentiveness factors for the user may be calculated at module 442. The first and second attentiveness factors may be calculated based on the set of first user sensor data. Generally, calculating can include computing, formulating, deriving, ascertaining, or otherwise determining the first and second attentiveness factors for the user. In embodiments, calculating the first and second attentiveness factors may include comparing the collected set of first user sensor data with a set of attentiveness benchmark data. The set of attentiveness benchmark data may define averages, standards, or normative levels for user attentiveness to an activity. The set of first user sensor data may be examined with respect to the set of attentiveness benchmark data, and a quantitative assessment of the first user's attentiveness may be generated (e.g., first attentiveness factor of 44, second attentiveness factor of 82). Other methods of calculating the first and second attentiveness factors are also possible.

In embodiments, the set of first user sensor data may include one or more of a number of types at module 443. In embodiments, the set of first user sensor data may include a meeting entrance. The meeting entrance may include a first user signing in, logging, in, or otherwise joining the electronic meeting. In embodiments, the set of first user sensor data may include a typing speed. The typing speed may be a measure of how many words per minute the first user types over a particular time period (e.g., depending on the nature of the meeting, typing above a threshold level may indicate that the user is engaged in another task and is not attentive to the meeting). In embodiments, the set of first user sensor data may include a browser window focus. The browser window focus may include an indication of which application or applications are active or selected on a computing device of the first user (e.g., an application not related to the electronic meeting may indicate that a user is not attentive to the meeting). In embodiments, the set of first user sensor data may include an eye gaze. The eye gaze may include an indication of where the first user's gaze is directed (e.g., a gaze directed toward a computer screen may be an indication that the user is attentive to the meeting).

In embodiments, the set of first user sensor data may include a retina loss. The retina loss may include a detection that the first user's eyes are no longer visible by a camera (e.g., the first user is looking elsewhere than at a computing device displaying the electronic meeting, and may not be paying attention). In embodiments, the set of first user sensor data may include an application opening. The application opening may include a software program initiating (or closing) or becoming active on a computing device of the first user (e.g., a first user opening other programs may not be focused on the electronic meeting). In embodiments, the set of first user sensor data may include a number of opening applications. The number of open applications may include a count or measure of how many unique applications or programs are running on a computing device of the first user (e.g., a number of open applications above a threshold may be a sign of inattentiveness). In embodiments, the set of first user sensor data may include a set of social media activity. The set of social media activity may include instant messaging, email, business communications, personal communications, and social networking site use by the first user (e.g., chat messages exchanged with another participant in the meeting may indicate attentiveness to the meeting, while text messages to a personal acquaintance may indicate inattentiveness). Other types of first user sensor data beyond those described herein are also possible.

In embodiments, the first and second attentiveness factors may indicate apparent absence or apparent presence of the first user at module 444. For instance, in embodiments, the first attentiveness factor may indicate an apparent absence of the first user with respect to the electronic meeting. The apparent absence of the first user may include a lack of responsiveness to communication (e.g., first user doesn't respond to verbal questions or chat messages from other meeting participants), failure to join an electronic meeting, or an absent status indication (e.g., online activity indicator for the user lists the user is "idle" or "away"). In embodiments, determining the apparent absence may include using a camera to confirm that the first user is physically away from the electronic meeting. In embodiments, the second attentiveness factor may indicate an apparent presence of the first user with respect to the electronic meeting. For example, the apparent presence of the user may include prompt responses to communication (e.g., user quickly responds to verbal questions and chat messages from other meeting participants), a user sign-in to the electronic meeting, or an "active" status indication. As another example, determining the apparent presence may include using a camera or microphone to confirm that the first user is physically engaged in the electronic meeting. Other types of apparent absence and apparent presence are also possible.

In embodiments, the set of content summary data may be personalized for the first user at module 445. Generally, personalizing can include customizing, individualizing, distinguishing, adjusting or adapting the set of content summary data for the first user. Aspects of the disclosure relate to the recognition that, in certain embodiments, different users may have different roles (e.g., jobs, responsibilities), interests, areas of expertise, and other individual characteristics. Accordingly, aspects of the disclosure relate to generating an individualized set of content summary data relevant to the role and experience of a user. In embodiments, personalizing the set of content summary data may include using a set of user profile data to adapt the set of content summary data for the first user. The set of user profile data may include information regarding the educational experience, work experience, job role, responsibilities, interests, and other data for the first user. Based on the set of user profile data, the electronic meeting management system 410 may be configured to identify segments of the electronic meeting (e.g., based on metadata tags associated with the electronic meeting) that are expected to be particularly relevant or of interest to the first user. As an example, an electronic meeting may include a portion where a manager addresses different individuals and assigns tasks to the user based on the user's organizational role. For instance, the manager may address a salesperson and give instructions regarding sales techniques for a target demographic, a finance manager with a request to create a budget, and a senior engineer with design requests for a new product. Accordingly, for a first user associated with an organization role of "Product Design and Development Division" (e.g., as indicated by a set of profile data), a set of content summary data may be generated that emphasizes (e.g., provides greater detail) for the content regarding the design requests to the senior engineer, while other segments of the electronic meeting may be summarized at a higher level. Other methods of personalizing the set of content summary data are also possible.

In embodiments, determining the set of content summary data for the electronic meeting may include ingesting a first subset of the set of meeting data that pertains to a first topic of the electronic meeting at module 446. The first subset of the set of meeting data may be ingested with respect to the set of content summary data. Generally, ingesting can include importing, collecting, taking in, processing, or otherwise receiving the first subset of the set of meeting data. As described herein, aspects of the disclosure relate to the recognition that, in certain situations, particular users may only wish to view/listen/receive summary data for a portion of the electronic meeting that is associated with a particular topic or subject. Accordingly, in embodiments, aspects of the disclosure relate to identifying a first subset of the meeting data that pertains to a first topic. The first topic may include a subject matter or theme specified by the first user or automatically determined based on a set of profile data for the first user. As an example, consider that a first user specifies a first topic of "product manufacturing." Accordingly, the meeting management engine may parse the set of meeting data (e.g., using content analysis techniques to analyze semantic and syntactic content of the electronic meeting) to ascertain a subset of the meeting data that pertains to the topic of "product manufacturing." In embodiments, the first subset of the set of meeting data may be used to generate the set of content summary data. Other methods of ingesting the first subset of the set of meeting data are also possible.

In embodiments, a second subset of the set of meeting data that pertains to a second topic of the electronic meeting may be disregarded at module 447. The second subset of the set of meeting data may disregarded with respect to the set of content summary data. Generally, disregarding can include ignoring, deleting, discarding, or removing the second subset of the set of meeting data. Aspects of the disclosure relate to the recognition that, in certain embodiments, one or more portions of the electronic meeting may not be relevant to one or more users. Accordingly, in embodiments, aspects of the disclosure relate to removing a second subset of the set of meeting data that pertains to a second topic (e.g., that is not relevant to one or more users). For example, a set of profile data for a first user may indicate that the first user is associated with an organizational role of "network management." Accordingly, the meeting management engine may parse the set of meeting data (e.g., using content analysis techniques to analyze semantic and syntactic content of the electronic meeting) and ascertain a subset of the meeting data that pertains to a topic of "2nd quarter marketing budget" (e.g., a topic substantially unrelated to the role of the first user). As such, the second subset of meeting data that pertains to the topic of "2nd quarter marketing budget" may be filtered out of the set of content summary data for the first user. Other methods of disregarding the second subset of the set of meeting data are also possible.

In embodiments, a first relevancy factor for a first topic may exceed a benchmark relevancy factor for a first user at module 448. Generally, relevancy factors may include a quantitative indication of how pertinent, germane, or important a particular topic is with respect to a particular user. The benchmark relevancy factor may include a predetermined, threshold relevancy value that defines the boundary between substantially relevant and substantially non-relevant topics. As an example, a benchmark relevancy factor may include the value "75." Relevancy factors that exceed the benchmark relevancy factor may be considered for inclusion in the set of content summary data, and relevancy factors that do not exceed the benchmark relevancy factor may be disregarded with respect to the set of content summary data. As described herein, in embodiments, a first relevancy factor may exceed the benchmark relevancy factor. For instance, consider a user associated with an organizational position of "Senior Software Engineer" (e.g., as indicated by a set of user profile data). In embodiments, a first topic of "Compile-Time Operations" may be analyzed with respect to the organizational position of "Senior Software Engineer," and be assigned a first relevancy factor of 82. As such, it may be determined that the first relevancy factor of 82 for the first topic exceeds a benchmark relevancy factor of 75 with respect to the first user. As described herein, in certain embodiments, the first topic may be ingested for inclusion in the set of content summary data for the first user.

In embodiments, the benchmark relevancy factor for the first user may exceed a second relevancy factor for the second topic. For instance, with reference to the example above, a second topic of "3rd Quarter advertising budget" may be analyzed with respect to the first user having the organizational position of "Senior Software Engineer," and be assigned a second relevancy factor of 51. Accordingly, it may be determined that the benchmark relevancy factor of 75 exceeds the second relevancy factor for the second topic of 51. As such, in certain embodiments, the second topic may be disregarded with respect to the set of content summary data for the first user (e.g., it is determined to be substantially irrelevant to the first user). Other methods of using the first and second relevancy factors to manage topics for inclusion in the set of content summary data are also possible.

In embodiments, providing the set of content summary data may include delivering the set of content summary data at a delivery pace faster than a meeting pace at module 451. Generally, delivering can include presenting, displaying, exhibiting, streaming, or otherwise conveying the set of content summary data. As described herein, aspects of the disclosure relate to providing the set of content summary data to the user seamlessly (e.g., unobtrusively, without interrupting the electronic meeting). Accordingly, in certain embodiments, providing may include delivering the set of content data at a speed faster than that of the in-progress electronic meeting such that a user may catch up to the real-time progression of the meeting. As an example, delivering the set of content summary data may include replaying a recorded video or audio clip of the electronic meeting at 1.5 times normal speed, or providing a scrolling text summary at a speed faster than the dialogue of the electronic meeting. As another example, delivering may include identifying a break in the meeting (e.g., coffee break, bathroom break, intermission) and providing the set of content summary data during the break (e.g., such that the user is able to catch up on the developments of the meeting). Other methods of delivering the set of content summary data at a delivery pace faster than a meeting pace are also possible.

In embodiments, aspects of the disclosure relate to providing different sets of content summary data for different users at module 452. As described herein, individualized sets of content summary data may be generated for different users based on their attentiveness to the electronic meeting at different times as well as individual sets of user profile data (e.g., containing preferences, work experience information, organization role, and other user information). Consider, for instance, that a first user may be provided a first set of content summary data for an electronic meeting between a first time (e.g., 3:34 PM) and a second time (e.g., 3:40 PM). The first set of content summary data may pertain to a topic of "fertilizer distribution" based on the first user's profile data indicating an organizational role of "Fertilizer Sales." In embodiments, a second user may receive a second set of content summary data for the electronic meeting that is different than the first set of content summary data. For example, a third attentiveness factor (e.g., indicating non-attentiveness) for the second user may be detected at a third time (e.g., 3:28 PM), and a fourth attentiveness factor (e.g., indicating regained attentiveness) may be detected for the second user at a fourth time (e.g., 3:36 PM). A meeting management engine may be configured to capture a second set of meeting data (e.g., record audio/video content for the meeting) between the third time and the fourth time, and the second set of meeting data may be used to determine and provide a second set of content summary data for the electronic meeting between the third and fourth time. As such, the second set of content summary data may cover a different time period and different topics than the first set of content summary data received by the first user. For instance, the second set of content summary data may substantially pertain to a topic of "fertilizer chemistry" based on the second user's profile data indicating an organization role of "Fertilizer Research and Development." Other methods of generating the set of content summary data are also possible.

In embodiments, detecting the first attentiveness factor for the first user may include selecting the first attentiveness factor for the first user at the first time based on a set of first user profile data at module 453. The first attentiveness factor may be selected by the meeting management engine. Generally, selecting can include choosing, picking, electing, specifying, or designating the first attentiveness factor. Aspects of the disclosure relate to the recognition that, in certain embodiments, a set of profile data for a user may provide indications of certain times when a user is expected to be associated with substantially low or substantially high attentiveness (e.g., with respect to an electronic meeting). Accordingly, in embodiments, aspects of the disclosure relate to leveraging the set of profile data to anticipate a predicted attentiveness factor and select it for a first user at a first time. Consider, for instance, that a set of profile data for a first user includes a schedule or calendar of events for the first user. The schedule may indicate that the first user has a phone call scheduled that overlaps with a portion of the electronic meeting. Accordingly, in embodiments, the meeting management engine may determine that the first user is likely to be inattentive to the electronic meeting during the scheduled phone call, and may select a first attentiveness factor to indicate inattentiveness for the first user at a first time corresponding to the start time of the phone call. As another example, the set of profile data for a first user may indicate that the first user regularly takes a break (e.g., coffee break, restroom break) at a certain time each day. Accordingly, the first user may be assigned an attentiveness factor to indicate inattentiveness at a time associated with their regular break. Other methods of selecting the first attentiveness factor for the first user based on a set of first user profile data are also possible.

In embodiments, the set of content summary data may be organized in a reverse chronological order by topic at module 454. Organizing the set of content summary data in a reverse chronological order by topic may include providing a most recent topic before a least recent topic. Generally, organizing can include ordering, structuring, sequencing, formulating, or otherwise arranging the set of content summary data in reverse chronological order. Aspects of the disclosure relate to the recognition that, in certain embodiments, it may be desirable to present the set of content summary data to users such that the newest information is provided first. As such, aspects of the disclosure relate to arranging the set of content summary data such that topics covered more recently are displayed in advance of older topics. In embodiments, organizing may include analyzing a set of timestamp metadata associated with the set of meeting data to ascertain a chronological order for topics discussed over the course of the electronic meeting, and structuring the set of content summary data such that more recent topics are presented first, and older topics are presented later (e.g., last). As an example, in response to determining that a first topic of "client billing practices" was discussed at 4:14 PM, a second topic of "conference room remodeling" was discussed at 4:17 PM, and a third topic of "change to exercise room usage hours" was discussed at 4:22 PM, the set of content summary data may be organized to present the third topic first, followed by the second topic, with the first topic presented last. Other methods of organizing the set of content summary data in reverse chronological order by topic are also possible.

In embodiments, the set of content summary data may be organized in a topical time-spent order by time spent at module 455. Organizing the set of content summary data in a topical time-spent order by time spent may include providing a most time-spent topic before a least time-spent topic. Generally, organizing can include ordering, structuring, sequencing, formulating, or otherwise arranging the set of content summary data in topical time-spent order. Aspects of the disclosure relate to the recognition that, in certain embodiments, it may be desirable to present the set of content summary data to users such that the topics that were discussed for the longest period of time (e.g., important, significant topics) are provided first. As such, aspects of the disclosure relate to arranging the set of content summary data such that topics that occupy discussion for a longer period of time are displayed in advance of older topics. In embodiments, organizing may include analyzing a set of timestamp metadata associated with the set of meeting data to ascertain the length of time that different topics were discussed, and structuring the set of content summary data such that topics discussed for longer periods of time are presented first, and topics discussed to a lesser extent are presented later. As an example, in response to determining that a first topic of "network traffic increase" is discussed for 14 minutes, a second topic of "proposal to increase number of servers" is discussed for 28 minutes, and a third topic of "virtual machine migration" is discussed for 11 minutes, the set of content summary data may be organized to present the second topic first, followed by the first topic, with the third topic presented last. Other methods of organizing the set of content summary data in a topical time-spent order are also possible.

Figure 5:
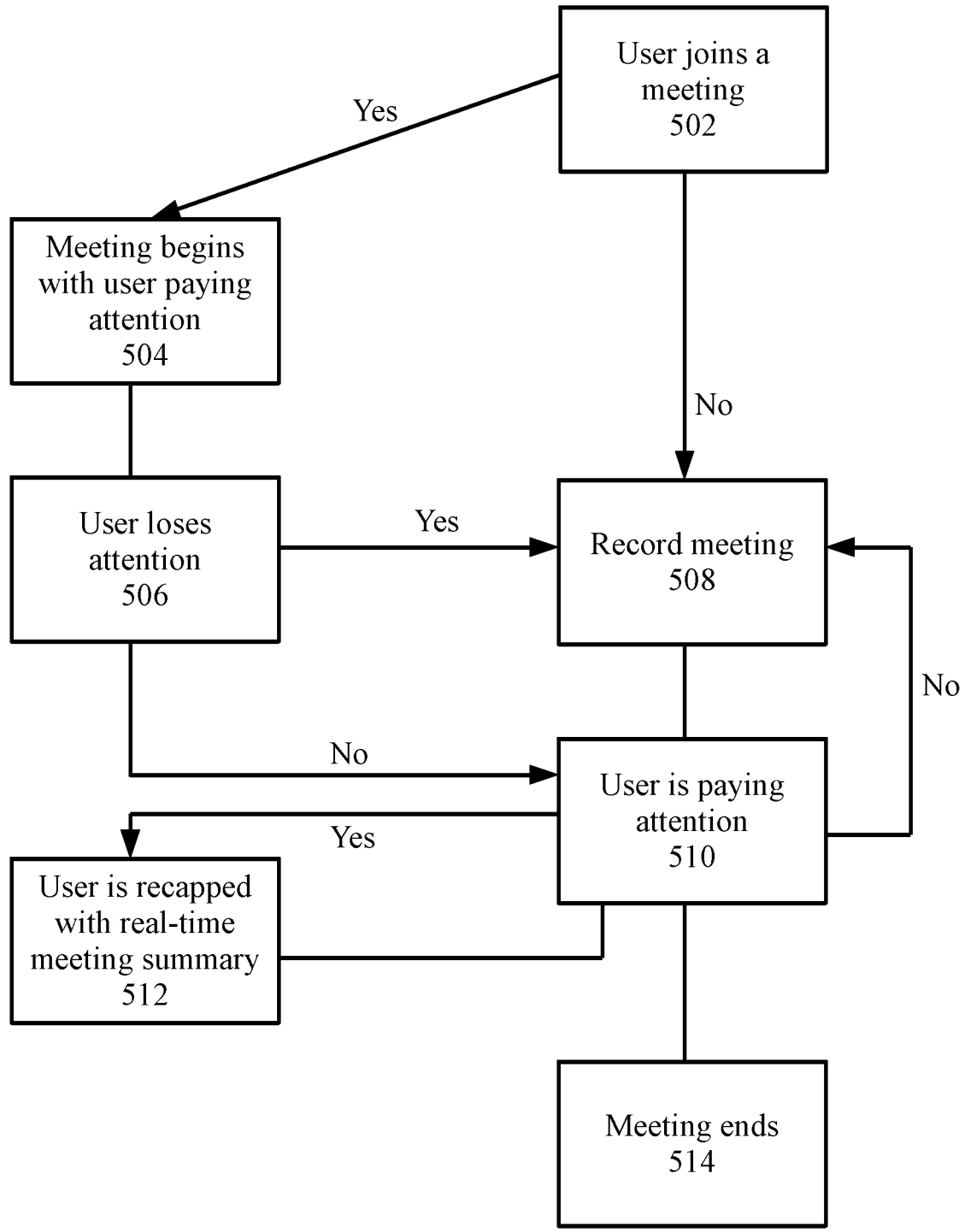
FIG. 5 is a flowchart illustrating a method for electronic meeting management, according to embodiments.

FIG. 5 is a flowchart illustrating a method 500 for electronic meeting management, according to embodiments. Aspects of FIG. 5 relate to making use of data regarding user behavior and attentiveness to identify portions of electronic meeting content for summary or recapping. The method 500 may begin at block 502. At block 502, a user may join a meeting. For instance, the user may sign in to an electronic meeting host, call in to a conference call, or otherwise begin participation in an electronic meeting. At block 504, the meeting may begin and the user may be attentive to the content and progression of the meeting. In embodiments, aspects of the disclosure relate to the recognition that a user may not join a meeting on time. As such, in the event that a user is late for or does not join a meeting at the start time (e.g., previous meeting has not finished), the method may proceed to block 508 and automatic recording of the electronic meeting may begin. As described herein, aspects of the disclosure relate to the recognition that at one or more points during the electronic meeting, the user may lose attention or attentiveness to the meeting at block 506 (e.g., distracted by a phone call, email, restroom break, or other event). In response to the user losing attention, the method may proceed to block 508, and recording of the meeting may begin. When the user regains attentiveness with respect to the electronic meeting (or does not lose attention) the method may proceed to block 510. In embodiments, as described herein, in the event that a user who had last attention has returned his or her attention to the meeting, the method may proceed to block 512 and the user may be provided with a real-time meeting summary (e.g., set of content summary data) for the portion of the meeting to which he or she was not attentive. The process of monitoring a user's attentiveness, capturing meeting content during time periods of inattentiveness, and providing summary data to the user may continue until completion of the meeting at block 514.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of electronic meeting management, the method comprising:
    detecting, by a meeting management engine with respect to an electronic meeting, a first attentiveness factor for a first user at a first time;
    detecting, by the meeting management engine with respect to the electronic meeting, a second attentiveness factor for the first user at a second time, wherein the second time is subsequent to the first time, and wherein the second attentiveness factor differs from the first attentiveness factor;

capturing, by the meeting management engine between the first time and the second time, a set of meeting data for the electronic meeting;

composing, by the meeting management engine in an automated fashion based on the set of meeting data, a set of content summary data for the electronic meeting, wherein the set of content summary data comprises a summary of the set of meeting data captured between the first time and the second time; and displaying, by the meeting management engine to the first user, the set of content summary data in response to detecting the first user is attentive, wherein the set of content summary data is unobtrusively displayed to the first user during a break in the electronic meeting without interrupting the electronic meeting.

2. The method of claim 1, further comprising:

computing that a threshold attentiveness factor exceeds the first attentiveness factor for the first user;

initiating, based on and in response to computing that the threshold attentiveness factor exceeds the first attentiveness factor for the first user, capture of the set of meeting data for the electronic meeting;

computing that the second attentiveness factor for the first user exceeds the threshold attentiveness factor; and initiating, based on and in response to computing that the second attentiveness factor for the first user exceeds the threshold attentiveness factor, determination of the set of content summary data for the electronic meeting between the first time and the second time.

3. The method of claim 1, further comprising:

monitoring, using a set of computer-based sensors, the first user of the electronic meeting;

collecting, based on the monitoring, a set of first user sensor data; and calculating, based on the set of first user sensor data, the first and second attentiveness factors for the first user.

4. The method of claim 3, wherein the set of first user sensor data is based on a selection from a group consisting of: a meeting entrance, a typing speed, a browser window focus, an eye gaze, a retina loss, an application opening, a number of open applications, and a set of social media activity by the first user.

5. The method of claim 1, wherein the first attentiveness factor indicates an apparent absence of the first user with respect to the electronic meeting, and wherein the second attentiveness factor indicates an apparent presence of the first user with respect to the electronic meeting.

6. The method of claim 1, wherein the set of content summary data is selected from a group consisting of: a text transcript, an outline, a set of keywords, a set of topics discussed, an audio message, a video message, and a still image.

7. The method of claim 1, further comprising:

personalizing, for the first user, the set of content summary data based on a set of profile data for the first user, wherein the set of profile data for the first user comprises educational experience, work experience, job role, responsibilities, and interests for the first user.

8. The method of claim 1, wherein providing, by the meeting management engine to the first user, the set of content summary data includes:

delivering the set of content summary data at a delivery speed faster than a delivery speed of the electronic meeting.

9. The method of claim 1, further comprising:

organizing the set of content summary data in a reverse chronological order by topic including providing a most recent topic before a least recent topic, wherein the reverse chronological order is based on an order in which the topics were originally presented during the duration of the electronic meeting.

10. The method of claim 1, further comprising:

organizing the set of content summary data in a topical time-spent order by time-spent including providing a most time-spent topic before a least time-spent topic.

11. A computer program product for electronic meeting management, the computer program product comprising:

one or more computer-readable storage media and program instructions stored on the one or more computer-readable storage media, the program instructions comprising:

program instructions to detect, by a meeting management engine with respect to an electronic meeting, a first attentiveness factor for a first user at a first time;

program instructions to detect, by the meeting management engine with respect to the electronic meeting, a second attentiveness factor for the first user at a second time, wherein the second time is subsequent to the first time, and wherein the second attentiveness factor differs from the first attentiveness factor;

program instructions to capture, by the meeting management engine between the first time and the second time, a set of meeting data for the electronic meeting;

program instructions to compose, by the meeting management engine in an automated fashion based on the set of meeting data, a set of content summary data for the electronic meeting, wherein the set of content summary data comprises a summary of the set of meeting data captured between the first time and the second time; and program instructions to display, by the meeting management engine to the first user, the set of content summary data in response to detecting the first user is attentive, wherein the set of content summary data is unobtrusively displayed to the first user during a break in the electronic meeting without interrupting the electronic meeting.

12. The computer program product of claim 11, further comprising:

program instructions to compute that a threshold attentiveness factor exceeds the first attentiveness factor for the first user;

program instructions to initiate, based on and in response to computing that the threshold attentiveness factor exceeds the first attentiveness factor for the first user, capture of the set of meeting data for the electronic meeting;

program instructions to compute that the second attentiveness factor for the first user exceeds the threshold attentiveness factor; and program instructions to initiate, based on and in response to computing that the second attentiveness factor for the first user exceeds the threshold attentiveness factor, determination of the set of content summary data for the electronic meeting between the first time and the second time.

13. The computer program product of claim 11, wherein the program instructions to provide, by the meeting management engine to the first user, the set of content summary data includes:

program instructions to deliver the set of content summary data at a delivery speed faster than a delivery speed of the electronic meeting.

14. The computer program product of claim 11, further comprising:
program instructions to organize the set of content summary data in a reverse chronological order by topic including providing a most recent topic before a least recent topic, wherein the reverse chronological order is based on an order in which the topics were originally presented during the duration of the electronic meeting.

15. The computer program product of claim 11, further comprising:
program instructions to organize the set of content summary data in a topical time-spent order by time-spent including providing a most time-spent topic before a least time-spent topic.

16. A computer system for electronic meeting management, the computer system comprising:
one or more computer processors, one or more computer-readable storage media, and program instructions stored on the one or more computer-readable storage media for execution by at least one of the one or more processors, the program instructions comprising:
program instructions to detect, by a meeting management engine with respect to an electronic meeting, a first attentiveness factor for a first user at a first time;
program instructions to detect, by the meeting management engine with respect to the electronic meeting, a second attentiveness factor for the first user at a second time, wherein the second time is subsequent to the first time, and wherein the second attentiveness factor differs from the first attentiveness factor;
program instructions to capture, by the meeting management engine between the first time and the second time, a set of meeting data for the electronic meeting;
program instructions to compose, by the meeting management engine in an automated fashion based on the set of meeting data, a set of content summary data for the electronic meeting, wherein the set of content summary data comprises a summary of the set of meeting data captured between the first time and the second time; and
program instructions to display, by the meeting management engine to the first user, the set of content summary data in response to detecting the first user is attentive, wherein the set of content summary data is unobtrusively displayed to the first user during a break in the electronic meeting without interrupting the electronic meeting.

17. The computer system of claim 16, further comprising:
program instructions to compute that a threshold attentiveness factor exceeds the first attentiveness factor for the first user;
program instructions to initiate, based on and in response to computing that the threshold attentiveness factor exceeds the first attentiveness factor for the first user, capture of the set of meeting data for the electronic meeting;
program instructions to compute that the second attentiveness factor for the first user exceeds the threshold attentiveness factor; and
program instructions to initiate, based on and in response to computing that the second attentiveness factor for the first user exceeds the threshold attentiveness factor, determination of the set of content summary data for the electronic meeting between the first time and the second time.

18. The computer system of claim 16, wherein the program instructions to provide, by the meeting management engine to the first user, the set of content summary data includes:
program instructions to deliver the set of content summary data at a delivery speed faster than a delivery speed of the electronic meeting.

19. The computer system of claim 16, further comprising:
program instructions to organize the set of content summary data in a reverse chronological order by topic including providing a most recent topic before a least recent topic, wherein the reverse chronological order is based on an order in which the topics were originally presented during the duration of the electronic meeting.

20. The computer system of claim 16, further comprising:
program instructions to organize the set of content summary data in a topical time-spent order by time-spent including providing a most time-spent topic before a least time-spent topic.

* * * * *